J. F. HARDY.
DENTAL BROACH CUTTING MACHINE.
APPLICATION FILED JUNE 16, 1911.
1,124,728.
Patented Jan. 12, 1915.
4 SHEETS—SHEET 1.
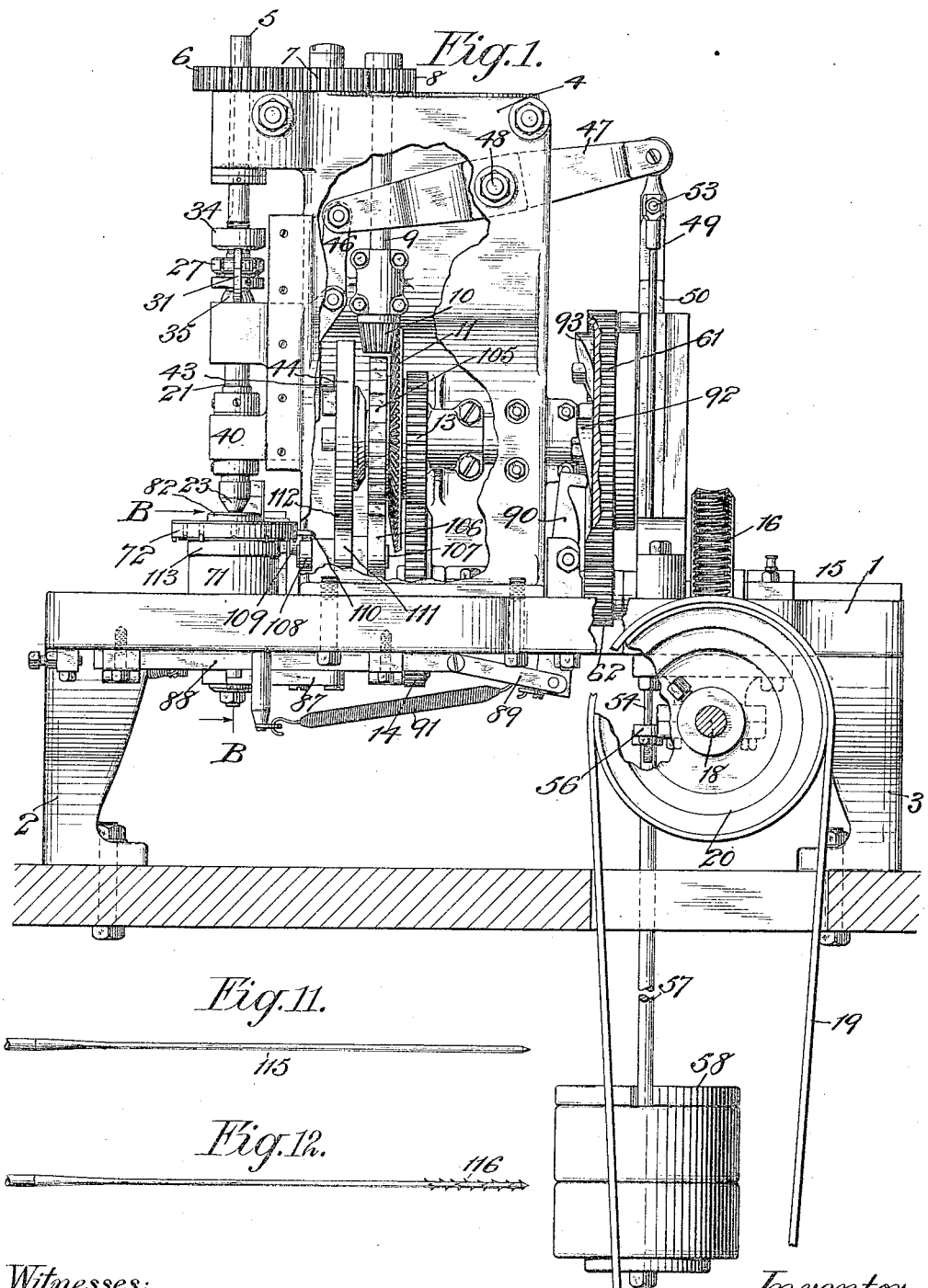

J. F. HARDY.
DENTAL BROACH CUTTING MACHINE.
APPLICATION FILED JUNE 16, 1911.
1,124,728.
Patented Jan. 12, 1915.
4 SHEETS—SHEET 2.
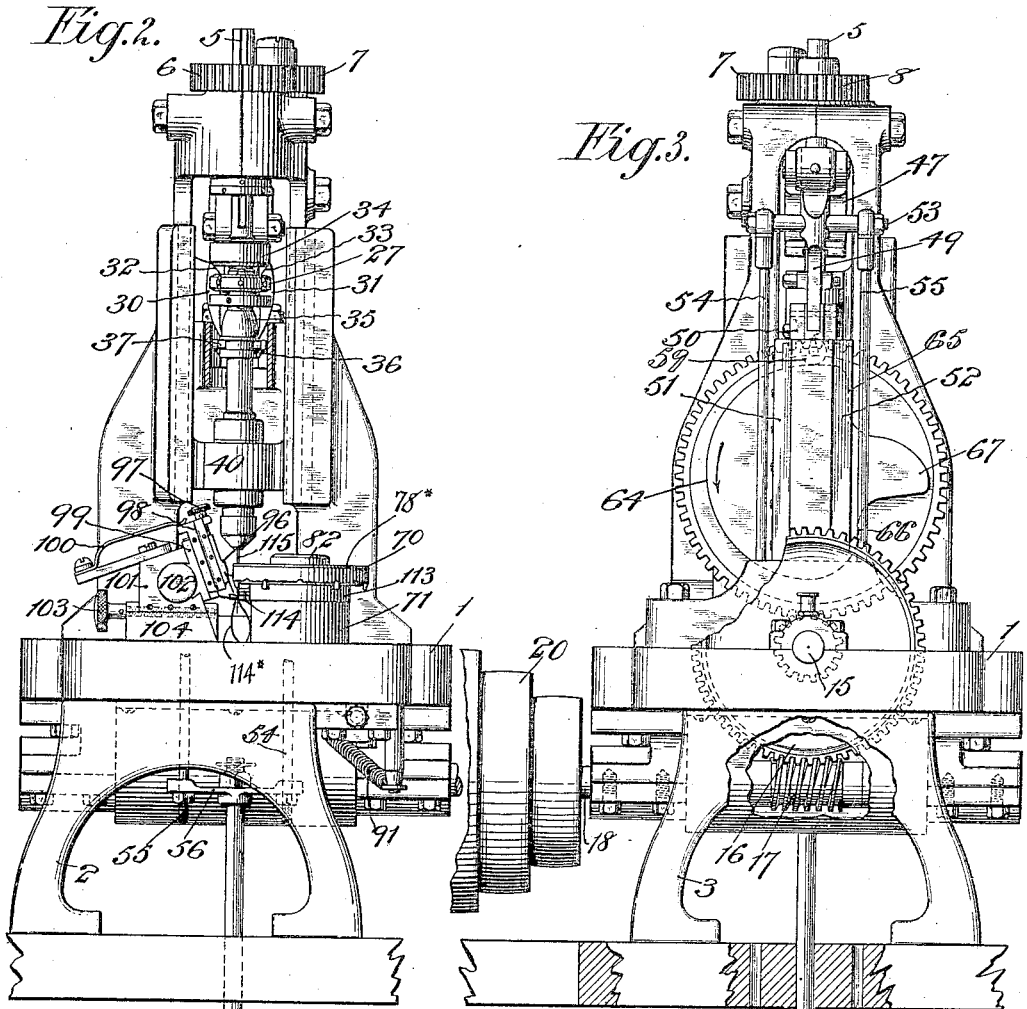
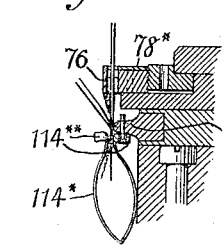
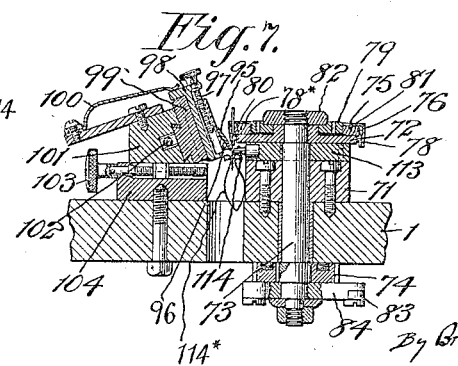
Witnesses:
Harry G. Fleischer
F. George Barry
Inventor:
James F. Hardy
By Arun Seward
Attys.

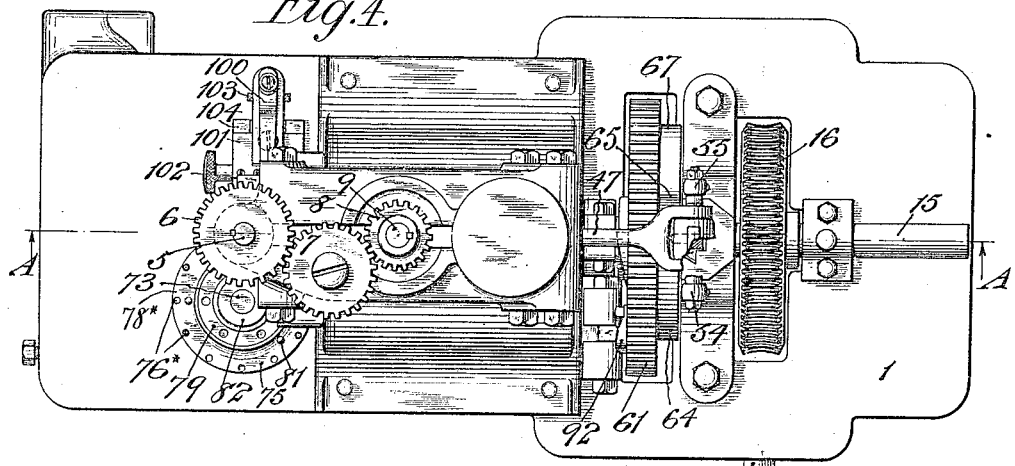
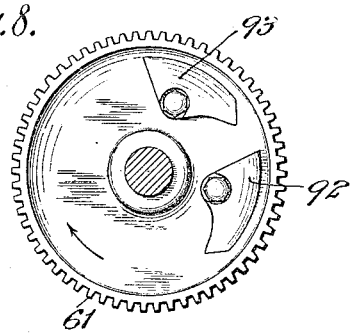
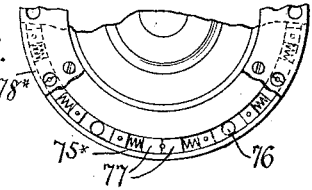
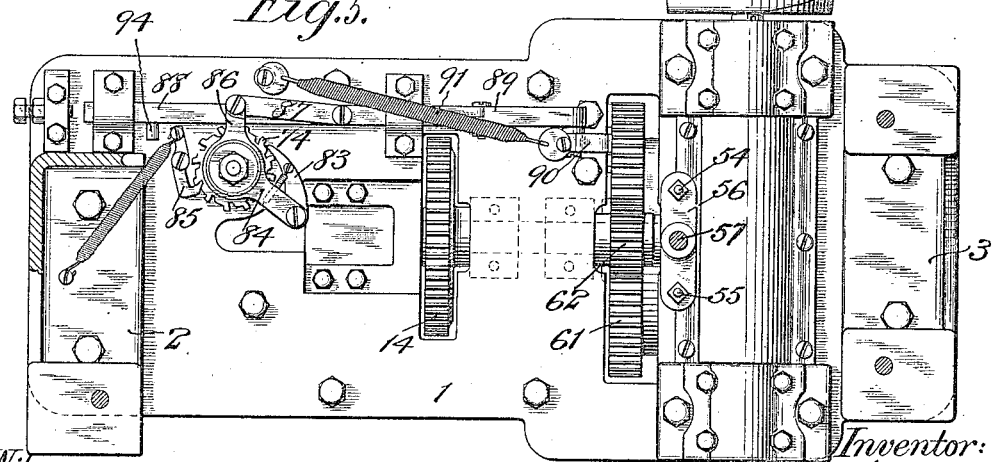

J. F. HARDY.
DENTAL BROACH CUTTING MACHINE.
APPLICATION FILED JUNE 16, 1911.
1,124,728.
Patented Jan. 12, 1915.
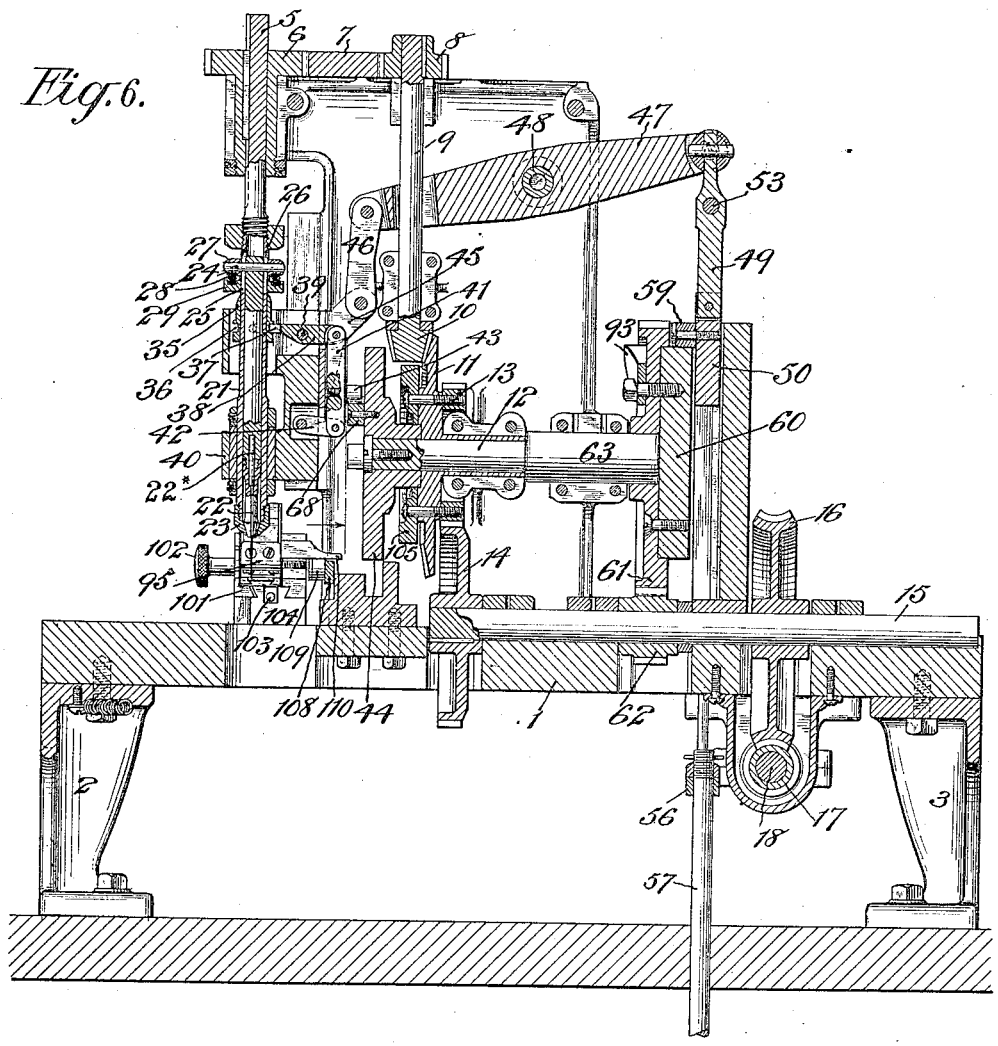
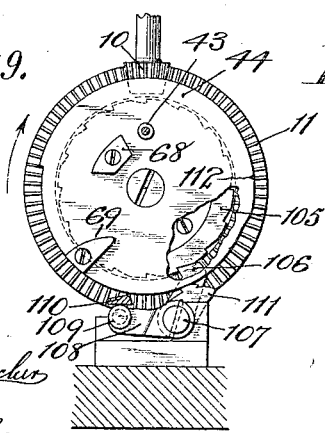
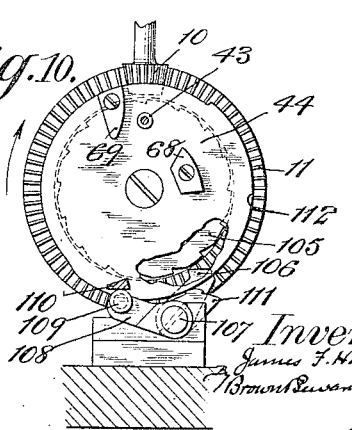
Witnesses:
Harry G. Fleischer
F. George Barry
Inventor:
James F. Hardy
Brown & Seward Attorneys
Attys.

UNITED STATES PATENT OFFICE.

JAMES F. HARDY, OF NEW YORK, N. Y., ASSIGNOR TO CONSOLIDATED DENTAL MANUFACTURING COMPANY, OF NEW YORK, N. Y., A CORPORATION OF NEW YORK.

DENTAL-BROACH-CUTTING MACHINE.

1,124,728.

Specification of Letters Patent.

Patented Jan. 12, 1915.

Application filed June 16, 1911. Serial No. 633,507.

*To all whom it may concern:*

Be it known that I, JAMES F. HARDY, a citizen of the United States, and resident of the borough of Manhattan, in the city and State of New York, have invented a new and useful Dental-Broach-Cutting Machine, of which the following is a specification.

My invention relates to a dental broach cutting machine with the object in view of providing a machine which will effectively and expeditiously cut the barbs on a dental broach.

In the accompanying drawings, Figure 1 is a view of the machine in side elevation, partly broken away to show operating parts. Fig. 2 is a view in front end elevation. Fig. 3 is a view in rear end elevation. Fig. 4 is a top plan view. Fig. 5 is a bottom plan view, one of the legs being shown in section to expose parts beneath it. Fig. 6 is a vertical section in the plane of the line A—A of Fig. 4. Fig. 7 is a vertical section in detail in the plane of the line B—B of Fig. 1. Fig. 8 is a side view in detail of the cam for operating the turret which presents the blank broaches to the spindle. Fig. 9 is a face view partly broken away, of the gear and cam for reciprocating the cutter, showing the toe of the cutter carrier in the position which it assumes when the cutter is in cutting position. Fig. 10 is a similar view, showing the toe of the cutter in the position which it assumes when the cutter is thrown out of cutting position. Fig. 11 is an enlarged view of a broach before the barbs are cut on it, Fig. 12 is a similar view showing its appearance after the barbs are cut thereon, Fig. 13 is an enlarged partial top plan view in detail of the turret partly broken away, and Fig. 14 is an enlarged partial vertical section in detail in the same plane as Fig. 7.

The main frame of the machine may be of any suitable form or structure adapted to support the working parts in such a manner as to enable them to do their work effectively. In the present instance it consists of a bed piece 1 supported on legs arranged at the ends in pairs, one pair being denoted by 2 and the other pair by 3, see Fig. 5. On the bed 1, there is a superstructure 4 for supporting various parts to be hereinafter particularly described.

My invention contemplates a rotary spindle provided with a chuck for receiving the broach blank to be barbed and for presenting it to the cutter; a turret for feeding the broach blanks into position to be grasped by the chuck in the spindle; a cutter arranged to present itself in cutting relation to the blank at predetermined intervals and mechanism for causing these operations to take place at proper intervals so that all that is required of the operator is to keep the turret supplied with broach blanks.

The spindle is denoted by 5. It has a vertically sliding movement by means of a feather and groove of ordinary construction in the hub of a gear wheel 6 in mesh with an intermediate gear wheel 7 which, in turn, is in mesh with the pinion 8 carried by a vertical shaft 9, the lower end of said shaft 9 being provided with a bevel gear pinion 10 driven by a bevel gear wheel 11 loosely mounted on a shaft 12.

The gear wheel 11 has fixed to rotate therewith, a spur gear wheel 13 which is driven by a spur gear 14 on a shaft 15.

The shaft 15 has fixed to rotate therewith, a worm wheel 16 driven by a worm 17 on the drive shaft 18 to which power may be applied in any well known or approved form, as, for instance, by a belt 19 engaging a pulley 20 on the shaft 18.

The spindle 5 has a downward extension in the form of a sleeve 21, in which sleeve there is mounted a split chuck 22, which, in the usual manner, is closed in gripping position by means of a tapered gland 23 at the lower end of the sleeve 21, the stem of the chuck 22 being provided with a cross pin 24 which extends through vertical elongated slots 25, 26, in the wall of the sleeve 21. The ends of the cross pin 24 are received in an annular sliding collar 27, the latter being supported on springs 28 which rest on a collar 29 fixed to the exterior of the sleeve 21, the tension of the said springs being such as to lift the sliding collar 27 and hence the cross pin 24 and chuck 22, away from its tapered gland, thereby allowing the jaws of the chuck to spring apart and open to release or receive a blank. This sliding collar 27 is forced downwardly to force the jaws of the chuck into the tapered gland 23 and hence close the chuck, by means of short levers 30, 31, see Fig. 2, pivoted in the edges of the sliding collar 27, with their upper beveled ends 32, 33, in position to engage the beveled under face of a collar 34 fixed to the sleeve 21 and to the spindle 5.

The lower ends of the levers 30, 31 are in position to engage the exterior of a sliding cone 35 mounted to slide on the sleeve 21 and provided with an annular groove 36 which receives fingers on the forked end 37 of an operating lever 38. This lever 38 is pivoted at 39 to a vertically sliding support 40 in which the lower end of the sleeve 21 is supported and guided, the said sliding piece 40 being mounted to slide in suitable ways in the superstructure 4. The end of the lever 38 opposite the forked end, is connected by a link 41 with a short link 42 also pivoted to the slide 40, the link 41 being provided with a roller 43 adapted to engage cams on the face of a cam wheel 44 to raise and lower the link and hence to lower and raise the cone 35 at the proper intervals, as will hereinafter appear.

The slide 40 is provided at its upper end with a tail piece 45 connected by a link 46 with one end of a walking beam 47, the latter being fulcrumed at 48 to the superstructure 4. The opposite end of the walking beam is connected by a link 49 with a vertical slide 50 arranged to slide in suitable ways 51, 52, on the superstructure, the said link 49 being provided with a cross pin 53 connected by rods 54, 55, with a cross head 56 below the bed 1 of the machine, the said cross head 56 having depending therefrom a rod 57 provided with a weight 58 to normally hold the end of the lever with which the link 49 is connected, in its lowered position and hence the slide 40 which supports the spindle in an elevated position.

The slide 50 attached to the link 49, has fixed thereto a roller 59 which is engaged by a cam 60 which lifts it and hence lowers the spindle, at such times as may be required.

The cam 60 has fixed to rotate therewith a spur wheel 61 in mesh with a pinion 62 on the shaft 15 driven as hereinbefore described, the said spur wheel 61, together with the cam 60, being fixed by means of a sleeve or hub 63, to rotate with the shaft 12, which shaft also has fixed to rotate therewith, the cam disk 44 hereinbefore referred to.

The shape of the cam 60 is clearly shown in Fig. 3, in which somewhat over two-thirds of the periphery is a gradual curved incline, denoted by 64, the opposite ends of this incline being separated by abrupt faces 65, 66, which in turn are intercepted by a pronounced nose 67.

The cam carrying disk 44 is provided on its face with an arc shaped short cam 68 for engaging the roller 43 and lifting it and hence lowering the cone 35, to permit the short levers 30, 31, to collapse and the springs 28 to extend and thereby lift the chuck, permitting its jaws to open and with the sharp nose cam 69 in position to engage the roller 43 a short time after it has been engaged by the cam 68, depressing the said link 41 and hence raising the cone 35, thereby spreading the lower ends of the levers 30, 31, and by the engagement of the upper ends of the levers with the beveled edge of the collar 34, depressing the collar 27 and hence forcing the chuck into its tapered gland to close it.

The mechanism for presenting the broach blanks to the spindle and its chuck is constructed and arranged as follows. A turret 70, shown in side elevation in Fig. 2, in top plan in Figs. 4 and 13 and in section in Fig. 7, is mounted in a suitable support 71 on the bed 1, and consists of a cylindrical plate 72, see Fig. 7, connected by a vertical shaft 73 with a ratchet wheel 74, the latter being on the under side of the bed 1. On the plate 72, an annular plate 75 is seated, with an annular groove 75* near its periphery and provided with a series of perforations 76 through the bottom of the groove. These perforations are alternately partially closed by spring actuated blocks 77, see Fig. 13, seated in the annular groove 75*. The cylindrical perforations 76, which are not partially covered by the spring actuated blocks 77, are provided with depending semi-cylindrical guides 78, see Fig. 7. On the annular plate 75 there is fixed a thin cap plate 78* provided with perforations 76* in register with the perforations 76 in the groove 75*.

The annular perforated plate 75 has an internally screw-threaded connection with a nut 79, as clearly shown in Fig. 7, whereby it, the plate 75, may be slightly raised or lowered with respect to the plate 72, by turning the nut 79 in the one direction or the other. The plate 75 is held from turning and guided in its slight vertical movement, by means of guide pins 80, 81. A cap nut 82 screwed on to the upper end of the shaft 73, holds the parts in assembled adjustment. A spring actuated pawl 83, see Fig. 5, carried by a rocking plate 84 on the lower end of the shaft 73, serves when operated to advance the ratchet wheel 74 step by step and hence rotate the perforated plate 75 step by step. A spring actuated retaining pawl 85, see Fig. 5, serves to hold the ratchet wheel 74 in the position to which it has been rocked by the pawl 83. The rocking plate 84 has a tail piece 86 to which a link 87 is attached and which connects the rocking plate with a sliding bar 88 on the under side of the bed 1.

The sliding bar 88 is connected by a link 89, see Fig. 1, with a rocking lever 90, fulcrumed to a suitable support on the bed 1, with the nose on its upper end held by means of a spring 91, in engagement with cams 92, 93, on the face of the spur wheel 61.

An abutment 94 on the sliding bar 88 is located in position to engage the tail of the retaining pawl 85, and hold it released from the ratchet wheel 74 at the moment the actuating pawl 83 engages a tooth of the wheel 74 to advance it. The holes 76 in the turret are partially closed by the sliding blocks 77, for the purpose of receiving broach blanks held in the small opening between the adjacent ends of the blocks in position to be grasped by the chuck in the spindle and the holes which alternate with these blocked holes, are for the purpose of introducing the broach to be operated upon by the cutter.

The cams 92, 93, on the face of the spur wheel 61 are arranged in such position that the turret will be rotated a step to place a broach blank in position to be grasped by the chuck in the spindle and then a moment later, after the blank has been withdrawn by the spindle from the turret, advance the turret another step to permit the blank held by the chuck to be introduced through the successive hole in the turret where it will be held in position to be operated upon by the cutters for a time sufficiently long to permit of the required cutting to produce the barbs throughout a considerable extent of its length, and when this has been accomplished, the chuck will release the blank, permitting it to drop through the hole before the turret is fed another step to present a new blank.

To insure a uniform length of projecting blank beyond the end of the chuck, the interior of the chuck has placed therein a spacing pin 22*, the end of which engages the end of the blank as the chuck is lowered to receive the blank, and any further downward movement of the chuck after such engagement will simply force the blank downward between the ends of the spring actuated blocks 77 without injury. The pin 22* may be exchanged for a longer or shorter pin to increase or lessen the projection of the blank.

The construction and arrangement of the cutter for cutting the barbs on the broach, are as follows. A cutter of any approved form, in the present instance, a blade 95, provided with a sharp edge, is fixed to the face of a cutter carrier 96, see Fig. 7, the cutter carrier 96 being adjustable in an oblique direction toward and away from the position of the broach to be operated upon, by means of an adjusting screw 97 swiveled in a sliding plate 98 and engaged with the cutter carrier. The sliding plate 98 is mounted in suitable ways in a block 99 and is forced toward the blank to be operated upon by means of a bar spring 100. The block 99 is also made adjustable horizontally in an intermediate block 101 by means of a screw 102, and the intermediate block 101 is also made adjustable together with the parts carried thereby, toward and away from the position of the blank by means of an adjusting screw 103. The intermediate block 101 is supported on a block 104 made fast to the bed plate 1. The cutter has imparted to it a succession of blows obliquely toward the broach blank by a wheel provided with a series of blunt teeth, which, through intermediate mechanism, lift the blade and its carrier against the tension of the spring 100, and then permit it to suddenly drop under the force of the spring 100 into engagement with the broach. This wheel provided with the series of blunt teeth, is shown in elevation in Fig. 1 and in section in Fig. 6 and is denoted by 105. It is fixed to rotate with the bevel gear wheel 11 hereinabove referred to, and its teeth engage the end of a short arm 106, see Fig. 9, which rocks together with the shaft 107, the said shaft having fixed to rock therewith, a short arm 108 carrying a roller 109 in position to engage a toe 110 on the cutter carrier and lift it and hence the blade as each tooth passes.

In order to prevent the arm 106 from engaging the teeth on the wheel 105 throughout a portion of the revolution of the wheel when the blank is not in a position to be cut, a relief dog 111 is provided which engages a cam rim 112 on the cam carrying disk 44, the said rim serving to rock the arm 106 outwardly away from the teeth when the cam surface on the rim engages the relief dog 111, as shown in Fig. 10. On the top of the turret support 71, beneath the plate 72, there is located the anvil plate 113 provided with an anvil 114 set in its periphery, the said anvil forming a support for the broach blank at a point opposite the point where the cutter engages the blank to form the barb. Below the anvil 114 and carried by the anvil is a flexible guide 114* in the form of a loop spring the free ends of which are provided with jaws 114** which lightly press on opposite sides of the barbed portion of the broach to prevent it from vibrating during the cutting operation.

In operation, assuming the parts to be in the position shown in the drawings, with a broach blank 115, see Figs. 2 and 11, in the opening 76, see Fig. 14, the blank having been fed downwardly until the barbed portion 116, see Fig. 12, is completed, and the cutter having been thrown out of action by the relief pawl 111 riding on the cam portion 112 of the disk 44, see Fig. 10, the further movement of the feed cam, see Fig. 3, will allow the end of the walking beam 47, which has been lifted by the feed cam, to drop the roller 59, passing down the sharp face 65 of the cam, and the broach now completely barbed will be relieved from the chuck and allowed to drop through the hole 76 by the engagement of the roller 43 carried by the link 41 with the short cam 68 on the disk 44, which lifts the link end of the lever 38 and depressing the cone 35, allowing the lower ends of the levers 30, 31, to approach each other and the collar 27, with its cross pin, to rise under the tension of the springs 28, thereby withdrawing the chuck from the tapered gland 23 and allowing it to open. At this moment the turret with a broach blank suspended in the blocked hole 76, will be advanced a step by the action of the cam 92 on the face of the gear wheel 61, which cam engages the rocking lever 90, and thereby, through the link 89 and sliding bar 88, rocks the pawl 83 in position to catch an advance tooth on the ratchet wheel 74, see Fig. 5, and as the nose of the lever 90 rides over the end of the cam 92, allows the spring 91 to exert its force in throwing the bar 88 in a direction to rock the pawl carrying disk and hence the pawl 83, in a direction to turn the ratchet wheel 74 and hence the turret. This action of the turret places a broach blank underneath the chuck in the spindle and at this moment the spindle is lowered by the riding of the roller 59 up one side of the nose 67 on the feed cam, thereby raising one end of the walking beam 47 and lowering the spindle until the chuck receives the upper end of the broach blank within its jaws, the chuck remaining open since it was permitted to open to release the previously barbed broach, and just before the roller 59 slides over the nose 67, the chuck is positively closed by the dagger cam 69 on the disk 44, see Fig. 9, which engages the roller 43 on the link 41, and depresses it, thereby lifting the cone 35 and spreading the lower ends of the levers 30, 31, and thereby forcing downwardly the collar 27 carrying the cross pin and with it the chuck into the tapered gland 23. The chuck having been closed, the roller 59 rides over the nose 67 on the feed cam and down its steep side, thereby, for reasons hereinabove explained, lifting the spindle and with it the broach blank now gripped by it. As soon as this takes place, the second cam 93, on the face of the gear wheel 61, see Fig. 1, engages the rocking lever 90, and, as hereinabove explained, feeds the turret another step, thereby placing a hole beneath the broach blank. This having taken place, the spindle is lowered by riding up the steep side 66 of the feed cam until the broach blank has its pointed end projecting slightly past the tip of the anvil 114, at which moment the relief pawl 111, see Fig. 10, rides off the cam 112, bringing the cutter into action, and repeated strokes of the cutter are delivered to the broach blank while it is being rotated by the gears 6, 7, 8, etc. receiving their motion from the drive shaft, and while the said blank is being gradually lowered by the action of the feed cam. This action of the cutter striking the broach blank at short intervals, will take place until the roller 59 approaches the position shown in dotted lines in Fig. 3, when the action of the cutter on the broach blank will be stopped by the relief dog 111, lifting the arm 106 out of contact with the notched wheel 105, and the completed broach will be discharged and a new blank previously inserted in one of the blocked holes in the turret will be automatically grasped and presented for barbing as hereinabove described.

The broach blanks may be fed into the blocked holes by the attendant as fast as the holes pass from beneath the chuck in the spindle, and thus a supply maintained to permit the machine to continue its action.

It is obvious that changes might be resorted to in the form and arrangement of the several parts without departing from the spirit and scope of my invention; hence I do not wish to limit myself strictly to the structure herein shown and described, but

What I claim is:

1. A broach barbing machine comprising a spindle provided with a chuck for holding a broach blank, means for rotating and bodily reciprocating the spindle, means for opening and closing the chuck, means for automatically presenting a blank to the chuck, a cutter and means for forcing the cutter into engagement with the broach blank at intervals as the spindle advances.

2. In a machine for barbing broach blanks, a reciprocating cutter, means for advancing the blank point foremost gradually past the edge of the cutter and an anvil for supporting the blank at the moment the edge of the cutter engages the blank.

3. In a machine for barbing broach blanks, means for rotating and advancing the blank, a cutter mounted to reciprocate in a path oblique to the longitudinal axis of the blank, means for operating the cutter, a cutter holder, means for adjusting the cutter holder in an oblique direction toward and away from the blank, a cutter holder support, means for adjusting the support in a direction laterally with respect to the blank and means for adjusting the support and hence the cutter holder and cutter bodily toward and away from the position of the blank.

4. In a machine for barbing broach blanks, a spindle for rotating and advancing the broach blank, a cutting mechanism, means for operating it, a turret for presenting the blank to the spindle and means for imparting to the turret a step by step motion.

5. In a machine for barbing broach blanks, a cutter, means for operating it, a spindle for presenting the broach blank to the cutter and a turret for presenting the broach blank to the spindle.

6. In a machine for barbing broach blanks, a cutter, means for operating it, a spindle for presenting a broach blank to the cutter and a turret for presenting a broach blank to the spindle, the said turret being provided with holes alternately arranged to hold a broach blank in suspension and permit the broach blank to pass through.

7. In a machine for barbing broach blanks, a cutter, means for operating it, a spindle for presenting a broach blank to the cutter, a turret for presenting a broach blank to the spindle and means for vertically adjusting the blank supporting head of the turret.

8. In a machine for barbing broach blanks, a cutter, means for operating it, a spindle for presenting a blank to the cutter, a turret for presenting a blank to the spindle and an anvil located beneath the head of the turret for supporting the blank at the moment the cutter engages it.

9. In a machine for barbing broach blanks, the combination with suitable means for rotating and advancing a broach blank and a cutter for operating upon the broach blank, of a device for presenting broach blanks to the rotating and advancing means, the said device being provided with holes spaced apart, one tapered to hold a broach blank in suspension and another cylindrical to permit the broach blank to drop through, and means for operating the said device.

10. In a machine for barbing broach blanks, the combination with suitable means for rotating and advancing a broach blank and a cutter for operating on a broach blank, of a turret provided with a series of holes, the said holes being alternately made taper to hold a broach blank in suspension and cylindrical to permit a broach blank to drop through, and means for imparting to the turret a rotary step by step movement.

11. In a machine for barbing broach blanks, the combination with a spindle and means for rotating it, of a cam for raising and lowering the spindle while it is being rotated, a chuck carried by the spindle, means for opening and closing the chuck, cams in position to operate the chuck opening and closing means at predetermined points in the bodily up and down movements of the spindle, a turret for presenting a broach blank beneath the chuck when the latter is raised and opened, and a cutter arranged to operate on the broach blank as the latter is gradually lowered.

12. In a machine for barbing broach blanks, the combination with a spindle for rotating and advancing a broach blank and a cam and intermediate mechanism for raising and lowering the spindle, of a turret for presenting the blanks to the spindle, cams fixed to rotate with the said spindle raising and lowering cam, a rocking lever operated by said cams, a sliding bar operated by said rocking lever, a ratchet toothed wheel fixed to rotate with the turret, pawls one for advancing the ratchet wheel and another for retaining the ratchet wheel, said pawls being operated by the sliding bar to impart to the turret a step by step movement, and a cutter arranged to operate on the blank.

13. In a machine for barbing broach blanks, the combination with suitable means for rotating and advancing a blank and a cutter for operating on the blank, of a turret for presenting blanks to be operated upon, the said turret having fixed to rotate therewith a ratchet toothed wheel, a rocking plate carrying a spring-actuating pawl for advancing the wheel, a spring-actuated retaining pawl, a sliding bar connected with the rocking plate and having thereon an abutment for engaging the retaining pawl, and cams arranged to operate the sliding bar at suitable intervals.

14. In a machine for barbing broach blanks, a spindle for rotating and advancing a blank, means for rotating the spindle, a weighted walking beam for raising and lowering the spindle, a cam for operating the walking beam in a direction opposed to the weight, a cutter arranged to act upon the blank and means for automatically presenting blanks to the spindle.

15. In a machine for barbing broach blanks, means for feeding the blanks to a cutter, a cutter, means for forcing it repeatedly into contact with the blank, means for advancing the blank past the cutter and means for automatically arresting the cutter and discharging the blank.

16. In a machine for barbing broach blanks, an antivibration device in position to engage the previously barbed portion of the broach while the latter is being acted upon by the cutter.

17. In a machine for barbing broach blanks, spring actuated devices for automatically holding a blank while being gripped, in combination with suitable automatic gripping and feeding mechanism.

18. In a machine for barbing broach blanks, a removable pin located within a spindle chuck to limit the movement of the chuck over the end of the blank, in combination with the chuck and cutter and means for operating them.

In testimony, that I claim the foregoing as my invention, I have signed my name in presence of two witnesses, this 14th day of June 1911.

JAMES F. HARDY.

Witnesses:
EUGENE J. MARTIN,
DAVID A. MCKENZIE.

Copies of this patent may be obtained for five cents each, by addressing the "Commissioner of Patents, Washington, D. C."